INVENTOR
WALTER LEWIS HYDE
ELDRED F. TUBBS
BY
ATTORNEY

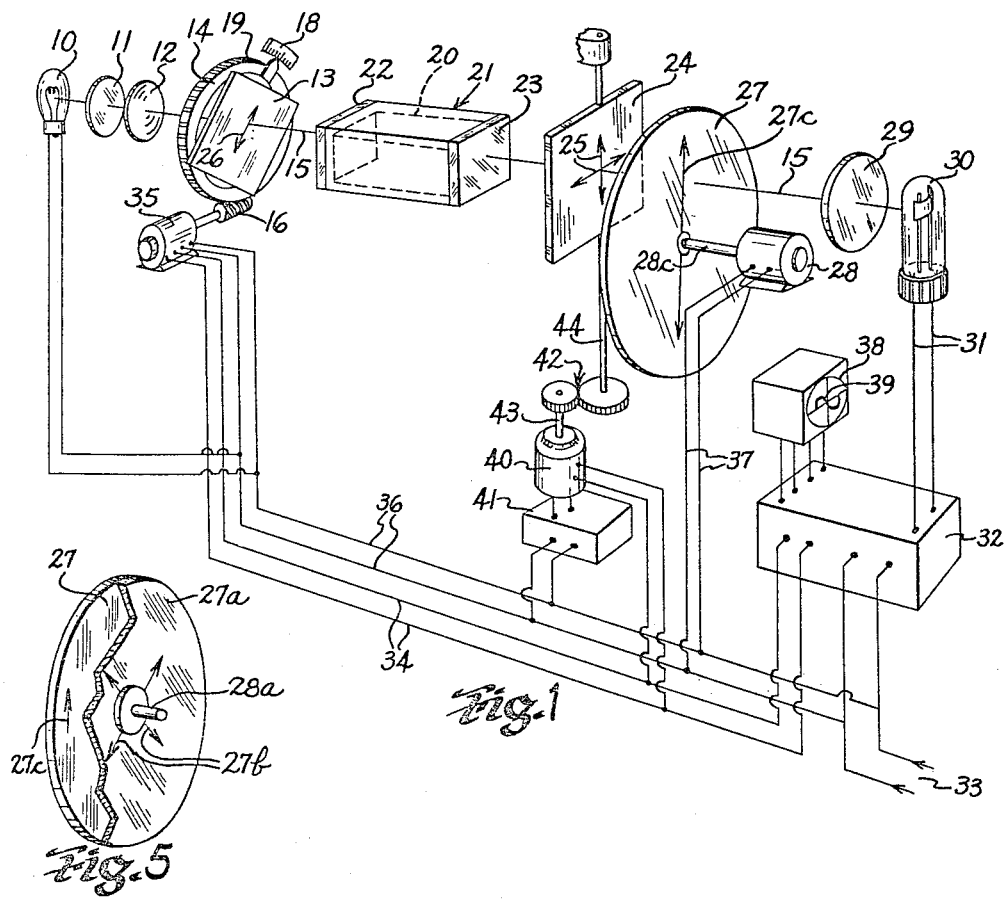

United States Patent Office 2,976,764
Patented Mar. 28, 1961

2,976,764

POLARIMETERS

Walter Lewis Hyde, East Woodstock, Conn., and Eldred F. Tubbs, Palo Alto, Calif., assignors to American Optical Company, Southbridge, Mass., a voluntary association of Massachusetts Filed Dec. 4, 1958, Ser. No. 778,159

9 Claims. (Cl. 88—14)

This invention relates to improvements in polarimeters and more particularly to photoelectric polarimeters which are easy to fabricate and keep in adjustment and which yield accurate measurements of the azimuth of polarized light.

Polarimeters are widely used as analytical tools in organic chemistry and particularly in the sugar industry, wherein readings made with the polarimeter have considerable monetary significance. Conventional visual polarimeters demand a certain amount of skill and training for use, are subjective in operation and thus subject to personal error, demand dark adaptation of the user, are time consuming in operation, and are non-recording. Photoelectric polarimeters have been attractive but have not displaced visual polarimeters heretofore because they have been complex in construction, hard to adjust, not superior in accuracy, and expensive to manufacture.

In view of the above-mentioned and other well-known drawbacks common to conventional polarimeters, it is a principal object of this invention to provide a photoelectric polarimeter which is simple in construction and operation, superior in accuracy of measurement, and economical to manufacture.

Another object is to provide an improved optical system for a photoelectric polarimeter which is simple, highly accurate, and free of errors in operation, and which is unaffected in its accuracy of measurement by low-quality polarizers, fatigue of photocells, stray light, or absorption and light scattering in a specimen being examined.

Another object is to provide a photoelectric polarimeter construction which is automatic and objective in operation and operates at high speed.

A further object is to provide an optical system for a photoelectric polarimeter which is capable of rapid measurement of optical activity of a sample at a number of wavelengths, and the recording of this measurement.

A still further object is to provide an optical system which can conveniently be used in mechanical alignment problems to determine the angular position of a distant object.

Other objects and advantages of the invention will become apparent from the detailed description which follows when taken in conjunction with the accompanying drawings in which:

Fig. 1 is a diagrammatic perspective view of one form of the device of the invention;

Fig. 2 is a series of vector diagrams illustrating the manner in which one type of ellipticity in polarized light incident upon an accurate quarter-wave plate can arise from different orientations of the incident polarized light;

Fig. 5 is a diagrammatic perspective view of a modified form of light analyzing means which may be incorporated in the device of the invention.

Figure 3:
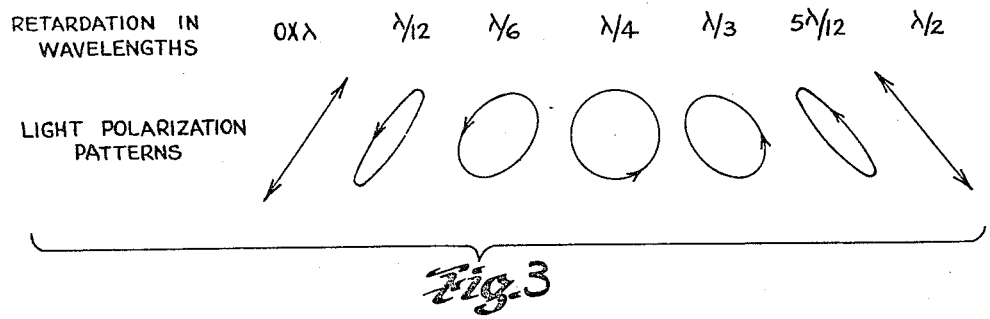
Fig. 3 is a series of vector diagrams illustrating the manner in which another type of ellipticity in polarized light can arise from different retardations of a retardation plate.

Referring more particularly to the drawings wherein like characters of reference designate like parts throughout the several views, the basic system of the device of the invention is illustrated in Fig. 1. A light source 10 illuminates the system, and may be monochromatic or heterochromatic according to the applications to which the polarimeter will be put, as will be described later. If the polarimeter is to be used for the study of rotatory dispersion (spectropolarimetry), light source 10 will appropriately be replaced by a suitable monochromator so as to illuminate the system with one selected wavelength at a time. If a monochromator is not used and the wavelengths of the light coming from the source 10 must be modified in some way, for instance to select a single wavelength from a gas discharge lamp, a suitable filter 11 which will allow only said single wavelength to pass therethrough is used. Otherwise the filter 11 is not included in the system. The light from the source 10 will hereafter be considered to have an average wavelength of light from the source 10 is roughly collimated by a conventional collimating lens 12, or the like, to deliver a more intense beam to the other elements of the system. However, the lens 12 may be discarded if the light source 10 is sufficiently intense. The light is next polarized by any conventional polarizer 13 which may, for instance, be a sheet of light polarizing film, or a Nichol prism, or a "pile-of-plates" having characteristics which will produce the desired polarization. Due to the fact that the quality of the polarizer 13 is of only secondary importance in the system, an important economical advantage is gained in the manufacture of the device of the invention.

The polarizer 13 is conveniently mounted in fixed relation with a rotatable mechanical holder 14 so as to be rotatable with the holder about the optical axis 15 of the system. The holder 14 for purposes of illustration is indicated schematically as being a ring gear driven by a worm gear 16 through the action of a servo motor 35. In order to make useful readings with the device of the invention, there is provided a stationary scale 18 showing the angular position of the polarizer 13 by the location of a pointer 19 which is fixed to and movable with the holder 14. It is to be understood that the polarizer 13 can be adjusted manually without the agency of the motor 35 if desired.

The polarized light leaving polarizer 13 passes through a sample 20 to be studied which is contained in a suitable holder or cell 21.

The sample 20 may, for instance, be a solution of sugar and water, a specimen of urine, a plate of optically active crystal such as quartz, or any substance which can be measured polarimetrically. The sample container is provided with transparent end windows 22 and 23 and, in order not to introduce errors in the measurements taken with the device of the invention, the container must not have inherent optical activity of its own. In particular, the end windows 22 and 23 are constructed to be free of strain and not subjected to strain in the loading of the cell. The construction and use of optically inactive cells of the above character is well known in the art.

The light leaving the cell 21 passes through an optical element 24 commonly known as a retardation plate characterized in that it can change linearly polarized light into circularly polarized light. In the case of this invention, the retardation plate is a quarter-wave plate 24 which may be a thin sheet of mica having two indices of refraction and of a thickness such that it is optically one quarter-wave thicker for one state of polarization of incident light than for the other. Thus, two light waves entering the plate 24 with the same phase will emerge with a phase difference of a quarter-wave.

Alternatively, the quarter-wave plate 24 may be replaced with a Fresnel rhomb such as described in the book "Fundamentals of Physical Optics" by Jenkins and White, page 396.

If the polarized light is incident on the quarter-wave plate 24 at angles other than exactly 45° to the axes 25 of the plate, the light will be elliptically polarized by the plate 24 and it will become apparent as this description progresses that the ellipticity of the polarized light leaving quarter-wave plate 24 is the criterion for the operation of the device of the invention. When the axis of polarization indicated by the arrow 26 of the polarizer 13 is oriented at exactly 45° to the axes indicated by the arrows 25 of the plate 24 and the cell 21 is empty, the light leaving the plate 24 will be circularly polarized in a manner to be described in greater detail hereinafter. For purposes of illustration, the polarizer 13 and the quarter-wave plate 24 are shown in Fig. 1 as being oriented at angles about the axis 15 of the system that differ by exactly 45°, and are thus correctly oriented to yield circularly polarized light and not elliptically polarized light when the sample cell 20 is empty.

The light leaving quarter-wave plate 24 passes through a rotating analyzer 27 drive directly by motor 28. The analyzer 27 is formed of a circular sheet of light polarizing material similar to the material of the polarizer 13. It is convenient to utilize a synchronous motor as the drive motor 28 so that it will run exactly in phase with A.-C. power supply 33 which is used to energize the electrical system of the device. However, it will become apparent as the description progresses that means may be provided to permit the use of other more powerful conventional non-synchronous motors.

The light leaving the analyzer 27 then passes through an optical depolarizer 29 and reaches a photoelectric cell 30 where it is converted into an electrical signal. The depolarizer in its simplest form may consist of a sheet of wax paper or the like.

It will now be seen that if the light leaving the quarter-wave plate 24 is exactly circularly polarized, rotation of the analyzer 27 will not influence the intensity of the light transmitted therethrough. However, the direction or state of polarization of the light will change continuously during the rotation. If the photoelectric cell has the same response for all states of polarization, which will often be the case, then perfect circularly polarized light will cause the photoelectric cell to produce a smooth direct current signal with no alternating current. When a photoelectric cell 30 such as the well known RCA photomultiplier 6199 (which is not polarization-sensitive) is used, the depolarizer 29 may be eliminated from the system. If, however, the photocell 30 is sensitive to the state of polarization of the light, which is the case when well-known photomultipliers of the type 1P21 or 931A are used, it is advisable to use the depolarizer 29.

The advantage gained by the use of the depolarizer 29 can alternatively be gained by fixing an additional quarter-wave plate 27a to the shaft 28a of motor 28 in side-by-side optically superimposed relation with the analyzer 27 (see Fig. 5) and facing the photocell 30 so that it rotates with the analyzer 27 and holds a fixed angular relationship to it. The axes 27b of the quarter-wave plate 27a should be fixed at 45° to the axis of polarization indicated by the arrow 27c of the analyzer. This method of overcoming a polarization-sensitive photocell scatters less light than the depolarizer 29 and is more efficient. Both the second quarter-wave plate and the depolarizer 29 may be used together if desired.

Those skilled in the art will appreciate that the photoelectric cell 30 may, without loss of generality, be of the photo-emissive type, the photo-voltaic type, the photo-conductive type, a photomultiplier, or even a thermocouple or bolometer, depending upon the wavelength region of the light being used.

The electrical signal from the photocell or photoelectric or other receiver 30 is transmitted through leads 31 to an alternating current amplifier 32 which also supplies the power necessary for proper operation of the receiver 30. The amplifier 32 is powered by an alternating current source 33. If it is desired, the power necessary for proper operation of the photoelectric or other receiver 30 may be supplied thereto independently of the amplifier 32.

In the preferred form of the invention, the amplified signal from the amplifier 32 is fed directly by leads 34 to a servo motor 35 driving the polarizer 13 through worm 16. The reference voltage for the servo motor 35 is fed thereto by leads 36 from the same A.-C. source 31 that gives power to the amplifier 32. The motor 28 which drives the analyzer 27 is connected to the A.-C. source 33 through leads 36 and 37 and when in operation, the motor 28 will run exactly in phase with the reference voltage to the servo motor 35 so that the rotation of the analyzer will be synchronized with said reference voltage.

The presence of an A.-C. signal produced by the photoelectric receiver 30 and amplified by the amplifier 32 shows that the system is not in its null condition, and the phase of the A.-C. signal indicates the direction of the deviation from the null. As stated hereinabove, an A.-C. signal will only be produced by the photoelectric receiver 30 when the light reaching the analyzer 27 is elliptically polarized and when the light is circularly polarized, no A.-C. signal will be produced by the photoelectric receiver 30.

An A.-C. signal arising from an ellipticity of polarization of the light reaching the analyzer 27 will drive the servo motor 35 in such a way as to re-orient the polarizer 13 and find a null where only circularly polarized light again reaches the analyzer 27.

If desired, the device of the invention may be operated manually with the servo motor 35 eliminated from the system. In such a case an A.-C. signal from the photoelectric receiver 30 is amplified at 32 and displayed on a suitable display device 38 such as, for example, a cathode-ray tube. With the cathode-ray tube connected to cause its vertical deflection to show the amplified A.-C. signal from the photoelectric receiver 30 and its horizontal deflection connected to and controlled by the A.-C. line voltage 33, the resulting pattern 39 on the face of the cathode ray tube will show both the sign and the magnitude of the error signal so that an operator can null the instrument by manually rotating the polarizer 13 until the pattern 39 on the cathode ray tube indicates that no A.-C. signal from the photoelectric receiver is present.

It has been said that if the axis of polarization of light of $\overline{\lambda}$ incident on an accurate quarter-wave plate 24 is not oriented at exactly 45° to the axes 25 of the plate 24, the transmitted light will be elliptically polarized rather than circularly polarized. It is further pointed out that polarized light which is of a wavelength other than $\lambda$ when passed through an accurate quarter-wave plate will also become elliptically polarized even though its axis of polarization is oriented at 45° relative to the axes of the plate (or what is equivalent, the quarter-wave plate is the wrong thickness). These two ways in which the light can become elliptically polarized cause A.-C. signals to be created by the photoelectric receiver 30 which are orthogonal (shifted 90° in phase) and can be distinguished from each other to operate the servo motor 35 or the cathode ray tube 38 or both to eliminate the above mentioned ellipticities in a manner as will be hereinafter described more in detail.

The vector diagrams of Figs. 2 and 3 indicate the two ways in which two kinds of elliptically polarized light can arise and the way in which they differ from each other. Fig. 2 illustrates vectorially the ellipticity of polarization resulting from different orientations of polarized light incident upon an accurate quarter-wave plate and Fig. 3 illustrates vectorially ellipticity of polarization resulting from various retardations of a light-retardation plate. To understand these diagrams which are light polarization patterns, it should be understood that the amplitude of polarized light transmitted through a conventional analyzer is proportional to the projection of the ellipse of the incident light on the transmission axis of the analyzer.

When examining ordinary plane polarized or elliptically polarized light by rotating an analyzer, there will be two maxima and two minima in the intensity of the light transmitted through the analyzer for each 360° of rotation, and the light will be modulated sinusoidally through two cycles in each rotation.

It will be seen by referring to Fig. 2, that there is shown several light polarization patterns resulting from the projection of variously oriented beams of polarized light through an accurate quarter-wave plate.

Considering the plate 24 of Fig. 1 to be the accurate quarter-wave plate which produces the polarization patterns shown in Fig. 2, and considering case c of Fig. 2 where the polarizer 13 is oriented at an angle other than 45°, namely 30°, it will be apparent that the analyzer 27 will yield a maximum in the intensity of the light reaching the photoelectric receiver 30 when its transmission axis of polarization 27c is oriented vertically, as shown, and a minimum in the intensity of the light reaching the photoelectric receiver 30 when its axis of polarization 27c is oriented horizontally. There will be two such maxima and minima per revolution of the analyzer 27. As stated hereinabove, this variation in the intensity of the light reaching the photoelectric receiver 30 will cause the receiver to produce an A.-C. signal of a frequency of twice the rate with which the analyzer is rotated and of a magnitude in accordance with the intensity of the light received thereby. Only when the incident light is polarized at 45° to the axes of the quarter-wave plate 24 (as shown in d of Fig. 2) will the A.-C. signal vanish. As the azimuth of incidence of the polarized light reaching the quarter-wave plate varies from 45° the A.-C. signal will appear in positive or negative phase according to the sign or direction of the deviation from 45°.

Referring now to Fig. 3, there is illustrated vectorially the polarization patterns resulting from projecting polarized light through retardation plates having various retardation values and wherein the axis of polarization of the light incident upon the retardation plate, in all cases illustrated, is oriented at 45° relative to the axes of the plate. It can be seen that the light will be circularly polarized by the plate only when the retardation value of the plate is $$\frac{\lambda}{4}$$

For retardations differing from $$\frac{\lambda}{4}$$

elliptically polarized light will be produced. Furthermore, the axes of the ellipse will be so oriented that the analyzer 27 will transmit a maximum or a minimum of light when its transmission axis of polarization 27c is oriented at a 45° angle with respect to the axes of the retardation plate, and two maxima and two minima in the intensity of the light leaving the analyzer will be produced per revolution of the analyzer. When the light from the analyzer is directed to a photoelectric receiver such as 30, the receiver will produce an A.-C. signal of a frequency of twice the rate with which the analyzer is rotated and of a magnitude in accordance with the intensity of the light received thereby. For a small error or change in retardation value of the retardation plate, the sign of the signal will be an indication of the sign of the error or change. That is, the signal will appear in positive or negative phase according to the sign of the deviation in retardation from $$\frac{\lambda}{4}$$

It will thus be seen that the two signals that result from elliptically polarized light arising from these two different causes will always be orthogonal or shifted 90° in phase to each other and can be measured independently with phase sensitive devices such as cathode ray tube 38 or servo motor 35.

It is important to note that if, in the system of Fig. 1, the phasing of the reference voltage 33 is incorrect in the servo motor 35, or in the cathode ray tube display means 38, and if a signal is present arising from an incorrect plate, an error in the final readings by the device of the invention might result. This error is easily suppressed by correcting the retardation of the quarter-wave plate 24, and a quarter-wave plate can be so corrected by rotating it around one of its symmetry axes 25. This is accomplished in the device of the invention by driving another servo motor 40 whose reference voltage has been shifted 90° in phase with respect to the voltage applied to the servo motor 35. A conventional 90° phase shifter 41 is used for this purpose. Since the angles through which the adjustment will take place are ordinarily very small, a reduction gear train 42 is used to connect the drive shaft 43 of the motor 40 with a spindle 44 which supports the quarter-wave plate 24. The axis of the spindle 44 passes vertically through the optical axis 15 of the system and in the direction of one of the symmetry axes of the quarter-wave plate 24.

If the phasing of the reference voltage 33 is incorrect in the servo motor 35 or in the display means 38 and if an error signal arises from incorrectness in the quarter-wave plate 24 or from its being improperly oriented about its supporting shaft 44, this incorrectness will be simultaneously sensed by both the motor 35 and the motor 40. The motor 40 which receives the reference voltage 33 phase shifted 90° (by the phase shifter 41) relative to the reference voltage 33 received by the motor 35 will operate, upon receipt of an error signal to adjust the retardation value of the plate 24 (by rotating the plate 24 about the axis of shaft 44) an amount to compensate for said incorrectness in the quarter-wave plate. In this manner, means is provided to automatically eliminate errors in the final readings made by the device of the invention which might otherwise result from slight changes in the phasing of the reference voltage or from an incorrect $$\frac{\lambda}{4}$$

plate or both. Obviously quarter-wave plate 24 can be manually adjusted by reference to signals displayed on display device 38.

The device of this invention offers the distinct advantage of being able to incorporate the use of relatively low quality and inexpensive polarizers without detriment to the accuracy of readings or measurements made. For example, if the polarizer 13 fails to give completely polarized light, the light which passes through the rest of the system will be a composite of unpolarized light (called leakage) and perfectly polarized light. The unpolarized light will remain unpolarized when it has passed through the quarter-wave plate, and will be uniformly transmitted by the analyzer 27 to the photoelectric receiver 30. The result will be an addition to the direct current signal produced by the photoelectric receiver 30 with no substantial contribution to any alternating current produced by the photoelectric receiver 30.

Since, as stated above, the analyzer 27 is simply a sheet of light polarizing material similar to that of the polarizer 13, the analyzer 27 need not be of a high quality for the reasons just given. This freedom from a need for high quality in the polarizer 13 and the analyzer 27 not only makes it possible to use inexpensive components in the device of the invention, but makes operation possible at wavelengths where high quality polarizers are unavailable in the ultraviolet and infrared.

While, for purposes of simplicity and economy, the preferred form of the invention utilizes the same A.-C. source 33 to operate the analyzer drive motor 28 and to serve as a reference voltage for the motors 35 and 40, it may be desirable in certain instances to use a non-synchronous motor 60 (see Fig. 6) to drive the analyzer 27 rather than the synchronous motor 28. Non-synchronous motors offer the advantage of being more powerful and the 60 cycle hum pickup common to synchronous operation is avoided.

Figure 6:
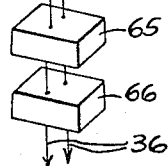
Fig. 6 is a diagrammatic perspective view of signal producing means which may be used in conjunction with the device of the invention.

When a non-synchronous motor 60 is used to rotate the analyzer 27, means must be provided to produce a reference voltage for the servo motors 35 and 40 which is synchronous with the rotation of the analyzer 27. This can be accomplished as shown in Fig. 6 by projecting light from a source 61 through a collimating lens or the like 62 and a polarizer 63 whereupon the polarized light from the polarizer 63 will pass through the analyzer and be received by photoelectric means 64. Each 360° rotation of the analyzer 27 will produce two maxima and minima in the intensity of the light incident upon the photoelectric means 64 which, in response to said light, will produce an A.-C. signal precisely synchronized with the rotation of the analyzer but at twice the frequency. The signal from the photoelectric means 64 is then amplified at 65. The phase can be shifted with a phase shifter 66, or by rotation of polarizer 63, or by adjustment of the rotational position of analyzer 27 on the shaft of motor 60, or by any combination of these. The reference voltage so generated is now supplied to motors 35 and 40 through leads 36.

The device of the invention operates as follows:

A sample 20 to be analyzed is placed within the container 21 and if the sample is, for example, a sugar solution, the polarized light from the polarizer 13 will, upon passing through the sample, be inherently rotated by the sample an amount in accordance with the concentration of the solution. With the system initially at a null position wherein the axis 26 of the polarizer 13 is oriented at 45° to the axes 25 of the quarter-wave plate 24 as described above, the rotation of the polarized light by the sample will cause the light to enter the quarter-wave plate with its axis of polarization at an angle other than 45° whereupon the light emerging from the quarter-wave plate will be elliptically polarized an amount in accordance with its rotation by the sample. The rotating analyzer 27 will then cause the intensity of the elliptically polarized light striking the photoelectric receiver 30 to vary sinusoidally whereupon an alternating current will be produced by the receiver 30, amplified by the amplifier 32 and transmitted through leads 34 to the motor 35 which, in response to the alternating current signal, will drive the polarizer 13 in such a direction as to again null the system by orienting the axis 26 of the polarizer 13 so that the light emerging from the sample will once again have its axis of polarization at 45° to the axes 25 of the quarter-wave plate. The extent of rotation of the polarizer 13 will be recorded on the scale 18 by the pointer 19 and an accurate indication of the concentration of the sample solution is determined from this reading.

It is to be understood that either liquid or solid light transmitting matter may be analyzed as outlined above. With the device of the invention, it is possible to rapidly and accurately as well as economically determine from the measurements, certain properties of the samples which would under ordinary circumstances require long, tedious and expensive analysis.

It is also pointed out that, quite obviously, the device of the invention may be used in ellipsometry for the measurement of the ellipticity of light induced by strain in glass or by reflection from thin films. This is accomplished by replacing the cell 21 with a sample of the glass or film to be measured and proceeding to operate the device as described above.

Figure 4:
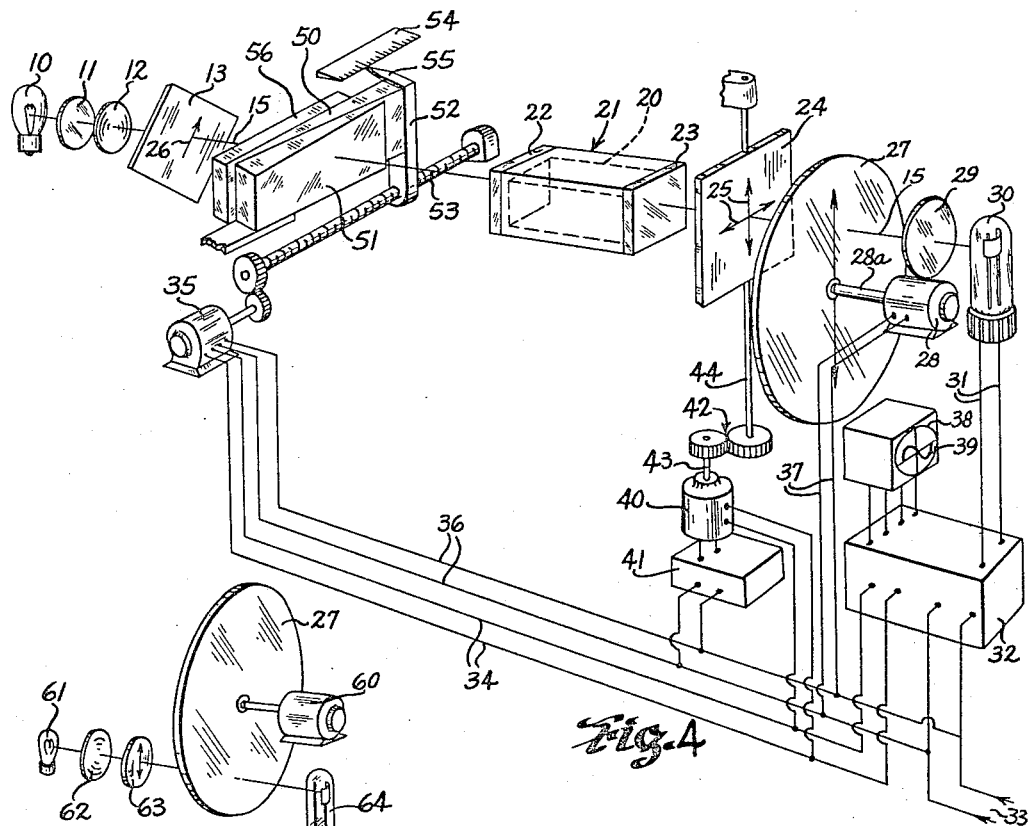
Fig. 4 is a diagrammatic perspective view of a modification of the device of the invention.

If the device of the invention is to be used specifically for saccharimetry, it may be modified as shown in Fig. 4 wherein the polarizer 13 is not rotated by the motor 35. In place of the ring gear 14, scale 18, and pointer 19 of Fig. 1, adjustable quartz wedges 50 and 51 and a fixed plane parallel slab of quartz 56 whose characteristics are such as to rotate polarized light are placed in the optical path of the system between the polarizer 13 and the sample holder or cell 21 (the wedges 50 and 51 may be placed between the cell 21 and plate 24, if desired).

In reference to the slab of quartz 56 and the wedges 50 and 51, it is a well-known fact that quartz will cause a rotation of polarized light passed therethrough in much the same manner as a sugar solution will. Furthermore, specific pieces of quartz may be chosen which will rotate polarized light in a desired direction, either left or right.

In the arrangement shown in Fig. 4, the wedges 50 and 51 are both selected to be of such character as to rotate polarized light in a direction opposite to the direction of rotation introduced by a sugar solution and the slab 56 is selected to be of such character as to rotate polarized light in the same direction as the sugar solution.

In order to be able to adjust the wedges 50 and 51 to a certain position relative to each other wherein no rotation of polarized light passing through the assembly will take place (while still maintaining an overlapping condition of the wedges), the slab 56 is placed in the optical path of the system of Fig. 4, as shown diagrammatically in the drawings. Thus, it can be seen that at one adjusted position of the wedges, wherein the rotary power of the slab will be equal and opposite to the rotary power of the combined wedges, polarized light will pass from the polarizer 13 through the slab and wedges without being rotated and the wedges need not be reduced to a zero front-to-back thickness to accomplish this.

With the quartz slab and wedge assembly adjusted so as to pass polarized light without introducing a rotation to the same, the system of Fig. 4, without the specimen (the sugar solution) in place can be nulled in exactly the same manner as described above for Fig. 1 and as will be described in greater detail hereinafter in a description of the operation of the system of Fig. 4.

The extent to which the quartz slab and wedge assembly will rotate polarized light can be controlled in accordance with the overall front-to-back thickness of the combined wedges 50 and 51 and means is provided to increase or decrease the overall front-to-back thickness of the combined wedges 50 and 51 and consequently the extent of rotation of polarized light passing through the quartz slab and wedge assembly. Said means comprises a supporting bracket 52 which is driven by a lead screw or the like 53 attached to wedge 50. The lead screw 53 is, in turn, geared to the motor 35 so that operation of the motor 35 will automatically rotate the lead screw and adjust the wedge 50 toward or away from the wedge 51 depending upon the direction of rotation of the motor 35. The extent of adjustment of the wedge 51 relative to the wedge 50 will be recorded by a fixed scale 54 and a pointer 55 which is attached to and movable with the wedge 51.

It is pointed out that various other types of adjustable quartz wedge constructions may be used such as, for example, a pair of wedges which are rotatably adjustable relative to each other to vary their overall front-to-back thickness.

In operation, the system of Fig. 4 is first nulled by adjusting the wedge 50 relative to wedge 51 so that polarized light from the polarizer 13 will not be rotated by the quartz assembly and next adjusting the polarizer 13 so that polarized light from the same which is incident upon the plate 24 has its axis of polarization at 45° with respect to the axes 25 of the plate 24 when the sample holder or cell 21 is empty. At this time, the light reaching the analyzer 27 will be perfectly circularly polarized and no A.-C. signal will be produced by the photoelectric receiver 30.

Alternatively, if the axis of polarization of the polarizer 13 is initially set at nearly 45° to the axes of the plate 24, the system of Fig. 4 can be nulled by adjusting the wedge 50 relative to the wedge 51 either manually or with the motor 35 to a position where no A.-C. signal is produced by the photoelectric receiver 30 when the cell 21 is empty.

When a solution of sugar and water is to be measured, it is placed in the cell 21, the polarized light passing through the sample will be rotated an amount in accordance with the concentration of the solution and the light from the sample which strikes the quarter-wave plate 24 will have its axis of polarization oriented to an angle other than 45° with respect to the axes 25 of the plate 24. As discussed hereinabove with reference to Fig. 1, this causes the light reaching the analyzer 27 to become elliptically polarized and its intensity to be varied sinusoidally by the rotation of the analyzer 27 whereupon an A.-C. signal will be produced by the photoelectric receiver 30. The A.-C. signal is then sent to the motor 35 which operates to adjust the wedge 50 relative to the wedge 51 so as to cause the front-to-back thickness of the wedge structure to be such as to introduce a rotation to the polarized light passing therethrough which is equal and opposite to the rotation introduced by the sample (the sugar solution). In so doing, the axis of polarization of the light incident upon the quarter-wave plate will again be oriented to 45° relative to the axes 25 of the plate 24 and only circularly polarized light will reach the analyzer 27. Thus, once again, no A.-C. signal will be produced by the photoelectric receiver 30 and the system with the sample in its optical path will be nulled.

At this time, a reading of the extent to which the wedge 50 was adjusted from the null position of the system is recorded on the scale 54 by the pointer 55 and from this reading an indication of the concentration of the sample (the sugar solution) is determined.

It is pointed out that either or both of the scales 18 or 54 of Figs. 1 and 4 respectively may be in the form of conventional automatic recording mechanisms to provide permanent recordings of measurements taken with the devices of the invention.

From the above, it can be seen that the invention features the combination of a single optical path (axis 15), a single photoelectric receiver 30 and a light retardation plate 24.

In view of the single optical path feature of the instrument of the invention the problem of cleanliness common to polarimeters which incorporate the use of two light beams separated in space and two photocells is obviated. It is also indifferent to photocell fatigue and enables the use of relatively low quality components and does not require critical alignment procedures.

In describing the device of this invention as a polarimeter, it is intended to give a general interpretation to the word since the instrument described hereinabove may be used as remote means for measuring tilt or roll of an object relative to a fixed point which otherwise cannot be measured from a nearby point. Further the twist of a portion of an object relative to another portion thereof may also be determined by the device of the invention.

For example, if it were necessary to accurately determine the twist of the axis of a ship at sea, the light source 10, polarizer 13 and motor 35 section of the instrument would be placed at one end of the ship and the quarter-wave plate 24, analyzer 27, and the photoelectric receiver 30 section would be placed at the other end of the ship and the two sections electrically connected as shown in Fig. 1. In this instance, of course, the sample holder or cell 21 would be eliminated from the system. A twist of the ship would cause the polarizer 13 to be rotated relative to the quarter-wave plate 24 thereby causing the photosensitive receiver 30 to create an A.-C. signal which would drive the motor 35 and rotate the polarizer 13 whereupon the extent of rotation would be recorded on the scale 18 by the pointer 19. In this manner a twist of as little as a few thousandths of a degree could be accurately measured and automatically recorded by connecting the pointer 19 to conventional recording apparatus or, if desired, the pointer 19 might be associated with means responsive to said twist for controlling the behavior of the ship.

From the foregoing, it can be seen that simple, efficient and economical means have been provided for accomplishing all of the objects and advantages of the invention. Nevertheless, it is apparent that many changes in the details of construction, and arrangement of parts may be made without departing from the spirit of the invention as expressed in the accompanying claims and the invention is not limited to the exact matters shown and described as only the preferred matters have been given by way of illustration.

Having described our invention, we claim:

1. A device of the character described embodying an optical system having a single optical path comprising a light source at one end of said path adapted to project light therealong, photoelectric light-receiving means at the opposite end of said path adapted to ultimately receive light from said source and convert the same into electrical signals, light-polarizing means in said optical path having its axis of polarization rotatably adjustable about said optical path, said light-polarizing means being adjacent said light source to intercept light from said source and to linearly polarize said light, a first electrical servo motor in driving relation with said light-polarizing means for rotating said light-polarizing means about said optical path, means for indicating the extent of rotation of said light-polarizing means, a retardation plate in said optical path adjacent the end thereof near said photoelectric light-receiving means, the plane of said retardation plate normally being substantially at right angles to the direction of said optical path, said plate having one light-retardation value in the direction of a first meridian and a different light-retardation value in the direction of a second meridian normal to said first meridian and being adapted to intercept and convert said linearly polarized light from said light-polarizing means into circularly polarized light, said plate being mounted to pivot about one of its meridians, a second electrical servo motor in driving relation with said plate to pivot the same, supporting means between said light-polarizing means and said retardation plate for supporting an optically active specimen to be tested in axial alignment with said optical path and through which said linearly polarized light passes to said retardation plate wherein said light will be characteristically changed by said specimen in accordance with its optical characteristics when said specimen is supported in said optical path, rotatable polarized light-analyzing means also in said optical path between said light-retardation plate and said photoelectric light-receiving means through which circularly polarized light from said light-retardation plate passes to said photoelectric light-receiving means, an electrical synchronous motor in driving relation with said analyzing means for continuously rotating said analyzing means at a rate in accordance with the phasing of a source of electrical energy supplied to said synchronous motor, said first servo motor being directly electrically connected to said source of electrical energy to receive a reference voltage from the same, phase-shifting means electrically connected between said second servo motor and said source of electrical energy adapted to receive and 90° phase shift the voltage from said source and to supply the phase-shifted voltage to said second servo motor as a reference voltage therefor, said photoelectric light-receiving means being electrically connected to said first and second servo motors to cause electrical signals produced by said photoelectric light-receiving means in response to characteristic changes in said light, which are brought about by said specimen, to be transmitted to said servo motors whereby said first servo motor will operate to adjust said light-polarizing means in accordance with said electrical signals produced by said photoelectric light-receiving means and said second servo motor will operate to pivot said retardation plate also in accordance with said electrical signals and the extent of adjustment of said light-polarizing means will be indicated by said indicating means.

2. A device of the character described embodying an optical system having a single optical path comprising a light source at one end of said path adapted to project light therealong, photoelectric light-receiving means at the opposite end of said path adapted to ultimately receive light from said source and convert the same into electrical signals, a light polarizer in said optical path having its axis of polarization rotatably adjustable about said optical path, said light polarizer being adjacent said light source to intercept light from said source and to linearly polarize said light, a first electric motor for rotating said light polarizer about said optical path, means for indicating the extent of rotation of said light polarizer, a retardation plate in said optical path adjacent the end thereof near said photoelectric light-receiving means, the plane of said retardation plate normally being substantially at right angles to the direction of said optical path, said plate having one light-retardation value in the direction of a first meridian and a different light-retardation value in the direction of a second meridian normal to said first meridian and being adapted to intercept and convert said linearly polarized light from said light-polarizing means into circularly polarized light, said plate being mounted to pivot about one of its meridians, a second electric motor in driving relation with said plate to pivot the same, supporting means between said light-polarizing means and said retardation plate for supporting an optically active specimen to be tested in axial alignment with said optical path and through which said linearly polarized light passes to said retardation plate wherein said light will be characteristically changed by said specimen in accordance with its optical characteristics when said specimen is supported in said optical path, rotatable polarized light-analyzing means also in said optical path between said light-retardation plate and said photoelectric light-receiving means through which circularly polarized light from said light-retardation plate passes to said photoelectric light-receiving means, means for rotating said polarized light-analyzing means at a precontrolled constant rate, means for supplying electrical energy of a frequency synchronous with said precontrolled rate of rotation of said analyzing means to said first and second motor as reference voltages therefor, said means for supplying electrical energy including phase-shifting means to 90° phase shift the voltage from said source and to supply the phase-shifted voltage to said second electric motor as a reference voltage therefor, said photoelectric light-receiving means being electrically connected to said first and second motors to cause electrical signals produced by said photoelectric light-receiving means in response to characteristic changes in said light, which are brought about by said specimen, to be transmitted to said motors whereby said first motor will operate to rotatably adjust said light polarizer in accordance with said electrical signals produced by said photoelectric light-receiving means and said second motor will operate to pivot said retardation plate also in accordance with said electrical signals and the extent of rotatable adjustment of said light polarizer will be indicated by said indicating means.

3. A device of the character described embodying an optical system having a single optical path comprising a light source at one end of said path adapted to project light therealong, a first photoelectric light-receiving means at the opposite end of said path adapted to ultimately receive light from said source and convert the same into electrical signals, light-polarizing means in said optical path having its axis of polarization rotatably adjustable about said optical path, said light-polarizing means being adjacent said light source to intercept light from said source and to linearly polarize said light, a first electrical servo motor in driving relation with said light-polarizing means for rotating said light-polarizing means about said optical path, means for indicating the extent of rotation of said light-polarizing means, a retardation plate in said optical path adjacent the end thereof near said first photoelectric light-receiving means, the plane of said retardation plate normally being substantially at right angles to the direction of said optical path, said plate having one light retardation value in the direction of a first meridian and a different light retardation value in the direction of a second meridian normal to said first meridian and being adapted to intercept and convert said linearly polarized light from said light-polarizing means into circularly polarized light, said plate being mounted to pivot about one of its meridians, a second electrical servo motor in driving relation with said plate to pivot the same, supporting means between said light-polarizing means and said retardation plate for supporting an optically active specimen to be tested in axial alignment with said optical path and through which said linearly polarized light passes to said retardation plate wherein said light will be characteristically changed by said specimen in accordance with its optical characteristics when said specimen is supported in said optical path, rotatable polarized light-analyzing means also in said optical path between said light-retardation plate and said first photoelectric light-receiving means through which circularly polarized light from said light-retardation plate passes to said first photoelectric light-receiving means, means for continuously rotating said analyzing means at a precontrolled rate, means for projecting linearly polarized light through said analyzing means along an axis spaced from and substantially parallel to said optical path of said system, a second photoelectric light-receiving means positioned to receive said light after being projected through said analyzing means along said axis, and to convert the same into an electrical reference signal of a frequency synchronized with the rotation of said analyzing means, means for amplifying said reference signal, said first servo motor being directly electrically connected to said amplifying means to receive a reference voltage from the same, phase-shifting means electrically connected between said second servo motor and said amplifying means adapted to receive and 90° phase shift the voltage from said reference signal source and to supply the phase-shifted voltage to said second servo motor as a reference voltage therefor, said first photoelectric light-receiving means being electrically connected to said first and second servo motors to cause electrical signals produced by said first photoelectric light-receiving means in response to characteristic changes in said light which are brought about by said specimen to be transmitted to both of said servo motors whereby said first servo motor will operate to rotatably adjust said light-polarizing means in accordance with said electrical signals produced by said first photoelectric light-receiving means and said second servo motor will operate to pivot said retardation plate also in accordance with said electrical signals and the extent of adjustment of said light-polarizing means will be indicated by said indicating means.

4. A device of the character described embodying an optical system having a single optical path comprising a light source at one end of said path adapted to project light therealong, photoelectric light-receiving means at the opposite end of said path adapted to ultimately receive light from said source and convert the same into an electrical signal characterized in accordance with the characteristics of the light received thereby, light polarizing means in said path adjacent the end thereof near said light source to intercept light from said source and linearly polarize the same, light-retardation means in said optical path through which said polarized light is passed, means for supporting a specimen to be tested in axial alignment with said optical path so as to cause said linearly polarized light to pass through said specimen before reaching said light-retardation means when said specimen is supported in said path, rotatable polarized light-analyzing means also in said optical path between said light-retardation means and said photoelectric light-receiving means through which polarized light from said light-retardation means passes to said photoelectric light-receiving means, means for continuously rotating said analyzing means, means associated with said photoelectric light-receiving means for interpreting said electrical signal produced by said photoelectric light-receiving means, adjustable means for altering the axis of said linearly polarized light in accordance with certain characteristic changes in said signal which may be brought about by said specimen and means for indicating the extent of said adjustment.

5. A device of the character described embodying an optical system having a single optical path comprising a light source at one end of said path adapted to project light therealong, photoelectric light-receiving means at the opposite end of said path adapted to ultimately receive light from said source and convert the same into an electrical signal characterized in accordance with the characteristics of the light received thereby, adjustable light polarizing means in said path adjacent the end thereof near said light source to intercept light from said source and linearly polarize the same, light-retardation means in said optical path adjacent the end thereof near said photoelectric light-receiving means through which said polarized light is passed, means for supporting a specimen to be tested in axial alignment with said optical path so as to cause said linearly polarized light to pass through said specimen before reaching said light-retardation means when said specimen is supported in said path whereby characteristic changes in said light may be produced by said specimen in accordance with its optical activity, rotatable polarized light-analyzing means also in said optical path between said light-retardation means and said photoelectric light-receiving means through which polarized light from said light-retardation means passes to said photoelectric light-receiving means, means for continuously rotating said analyzing means, means associated with said photoelectric light-receiving means for interpreting said electrical signal produced by said photoelectric light-receiving means, means for adjusting said adjustable light polarizing means in accordance with certain characteristic changes in said signal as brought about by said specimen and means for indicating the extent of said adjustment.

6. A device of the character described embodying an optical system having a single optical path comprising a light source at one end of said path adapted to project light therealong, photoelectric light-receiving means at the opposite end of said path adapted to ultimately receive light from said source and convert the same into an electrical signal characterized in accordance with the characteristics of the light received thereby, light polarizing means in said path adjacent the end thereof near said light source to intercept light from said source and linearly polarize the same, light-retardation means in said optical path through which said polarized light is passed, means for supporting a specimen to be tested in axial alignment with said optical path between said light-polarizing means and said light-retardation means so as to cause said linearly polarized light to pass through said specimen before reaching said light-retardation means when said specimen is supported in said path whereby characteristic changes in said light may be produced by said specimen in accordance with its optical activity, adjustable means between said light polarizing means and said light retardation means adapted to intercept said linearly polarized light and cause rotation of the axis of polarization of said linearly polarized light about said optical path in accordance with the extent of adjustment of said adjustable means, rotatable polarized light-analyzing means also in said optical path between said light-retardation means and said photoelectric light-receiving means through which polarized light from said light-retardation means passes to said photoelectric light-receiving means, means for continuously rotating said analyzing means, means for interpreting said electrical signal produced by said photoelectric light-receiving means, means for adjusting said adjustable means in accordance with certain characteristic changes in said signal as brought about by said specimen and means for indicating the extent of said adjustment.

7. A device of the character described embodying an optical system having a single optical path comprising a light source at one end of said path adapted to project light therealong, photoelectric light-receiving means at the opposite end of said path adapted to ultimately receive light from said source and convert the same into an electrical signal characterized in accordance with the characteristics of the light received thereby, light polarizing means in said path adjacent the end thereof near said light source to intercept light from said source and linearly polarize the same, light-retardation means in said optical path through which said polarized light is passed, means for supporting a specimen to be tested in axial alignment with said optical path between said light polarizing means and said light-retardation means so as to cause said linearly polarized light to pass through said specimen before reaching said light-retardation means when said specimen is supported in said path whereby characteristic changes in said light may be produced by said specimen in accordance with its optical activity, adjustable transparent wedge-like members of optically active material between said light polarizing means and said light-retardation means adapted to intercept said linearly polarized light and cause rotation of the axis of polarization of said linearly polarized light about said optical path in accordance with the extent of adjustment of said members relative to each other, rotatable polarized light-analyzing means also in said optical path between said light-retardation means and said photoelectric light-receiving means through which polarized light from said light-retardation means passes to said photoelectric light-receiving means, means for continuously rotating said analyzing means, means for interpreting said electrical signal produced by said photoelectric light-receiving means, means for adjusting said wedge-like members relative to each other in accordance with certain characteristic changes in said signal as brought about by said specimen and means for indicating the extent of said adjustment.

8. A device of the character described embodying an optical system having a single optical path comprising a light source at one end of said path adapted to project light therealong, photoelectric light-receiving means at the opposite end of said path adapted to ultimately receive light from said source and convert the same into electrical signals, a light polarizer in said optical path having its axis of polarization rotatably adjustable about said optical path, said light polarizer being adjacent said light source to intercept light from said source and to linearly polarize said light, a first electric motor for adjusting said light polarizer rotatably about said optical path, means for indicating the extent of rotational adjustment of said light polarizer, a light retardation plate in said optical path adjacent the end thereof near said photoelectric light-receiving means, means for supporting a specimen to be tested in axial alignment with said optical path so as to cause said linearly polarized light to pass through said specimen before reaching said light retardation plate when said specimen is supported in said optical path whereby characteristic changes in said light may be produced by said specimen in accordance with its optical activity, the plane of said retardation plate normally being substantially at right angles to the direction of said optical path, said plate having one light-retardation value in the direction of a first meridian and a different light-retardation value in the direction of a second meridian normal to said first meridian and being adapted to intercept and convert said linearly polarized light passing through said specimen into circularly polarized light, said plate being mounted to pivot about one of its meridians, a second electric motor for pivotally adjusting said retardation plate, rotatable polarized light-analyzing means also in said optical path between said light-retardation plate and said photoelectric light-receiving means through which circularly polarized light from said light-retardation plate passes to said photoelectric light-receiving means, electrical means for continuously rotating said analyzing means at a precontrolled rate, means for supplying electrical energy of a frequency synchronous with the rotation of said analyzing means to said first and second electric motors, said means for supplying electrical energy including phase shifting means to 90° phase shift the voltage of said electrical energy which is supplied to one of said electric motors, said photoelectric light-receiving means being electrically connected to said first and second electric motors to cause electrical signals produced by said photoelectric light-receiving means and characterized in accordance with the light received thereby after passing through said specimen to be transmitted to said electric motors whereby said first electric motor will operate to rotatably adjust said light polarizing means in accordance with said characteristic changes in said electrical signals and whereby said second electric motor will operate to pivotally adjust said retardation plate also in accordance with said characteristic changes in said electrical signals.

9. A device of the character described embodying an optical system having a single optical path comprising a light source at one end of said path adapted to project light therealong, photoelectric light-receiving means at the opposite end of said path adapted to ultimately receive light from said source and convert the same into electrical signals, light polarizing means in said optical path having its axis of polarization rotatably adjustable about said optical path, said light-polarizing means being adjacent said light source to intercept light from said source and to linearly polarize said light, a first electrical servo motor in driving relation with said light-polarizing means for rotating said light polarizing means about said optical path, means for indicating the extent of rotation of said light polarizing means, a retardation plate in said optical path adjacent the end thereof near said photoelectric light-receiving means, means for supporting a specimen to be tested in axial alignment with said optical path so as to cause said linearly polarized light to pass through said specimen before reaching said light-retardation plate when said specimen is supported in said optical path whereby characteristic changes in said light may be produced by said specimen in accordance with its optical activity, the plane of said retardation plate normally being substantially at right angles to the direction of said optical path, said plate having one light retardation value in the direction of a first meridian and a different light retardation value in the direction of a second meridian normal to said first meridian and being adapted to intercept and convert said linearly polarized light after having passed through said specimen from said light polarizing means into circularly polarized light, said plate being mounted to pivot about one of its meridians, a second electrical servo motor in driving relation with said plate to pivot the same, rotatable polarized light analyzing means also in said optical path between said light-retardation plate and said photoelectric light-receiving means through which circularly polarized light from said light-retardation plate passes to said photoelectric light-receiving means, an electrical synchronous motor in driving relation with said analyzing means for continuously rotating said analyzing means at a rate in accordance with the phasing of a source of electrical energy supplied to said synchronous motor, said first servo motor being directly electrically connected to said source of electrical energy to receive the same as a reference voltage, phase shifting means electrically connected between said second servo motor and said source of electrical energy adapted to receive and 90° phase shift the voltage from said source and to supply the phase shifted voltage to said second servo motor as a reference voltage for said second servo motor, said photoelectric light-receiving means being electrically connected to said first and second servo motors to cause electrical signals produced by said photoelectric light-receiving means in response to light received thereby to be transmitted to said servo motors whereby said first servo motor will operate to rotatably adjust said light polarizing means in accordance with said electrical signals produced by said photoelectric light-receiving means and said second servo motor will operate to pivot said retardation plate also in accordance with said electrical signals.

References Cited in the file of this patent
UNITED STATES PATENTS

| 2,189,270 | Pineo | Feb. 6, 1940 |
| 2,861,493 | Landegren | Nov. 25, 1958 |
| 2,877,683 | Fischer | Mar. 17, 1959 |

OTHER REFERENCES

"Photoelectric Flow Birefringence Instrument of High Sensitivity," Zimm, The Review of Scientific Instruments, vol. 29, No. 5, May 1958, pages 360–367.